United States Patent [19]
Thompson, Jr. et al.

[11] Patent Number: 6,109,854
[45] Date of Patent: Aug. 29, 2000

[54] APPARATUS FOR RAISING AND LOWERING BAGGAGE FROM AN ELEVATED PLATFORM

[75] Inventors: Victor H. Thompson, Jr., Burleson; Christina S. Gross; Keith W. Gross, both of Fort Worth, all of Tex.

[73] Assignee: Vic Thompson Company, Fort Worth, Tex.

[21] Appl. No.: 09/337,806

[22] Filed: Jun. 21, 1999

Related U.S. Application Data

[60] Provisional application No. 60/090,346, Jun. 23, 1998.

[51] Int. Cl.$^7$ .......................... B65G 67/04; B65G 67/24; F16B 7/00
[52] U.S. Cl. .......................... 414/398; 14/69.5; 14/71.1; 187/245; 198/750.01; 403/292; 403/294; 414/393; 414/395; 414/400; 414/514; 414/515; 414/521
[58] Field of Search ...................... 198/750.01; 414/538, 414/510, 514, 400, 515, 393, 398, 395, 521; 14/71.1, 69.5; 187/245; 403/292, 294

[56] References Cited

U.S. PATENT DOCUMENTS

| | | | |
|---|---|---|---|
| 2,487,613 | 11/1949 | Stone | 244/114 |
| 2,634,870 | 4/1953 | Barnum | 414/398 |
| 2,899,090 | 8/1959 | Holdren | 414/515 |
| 3,186,566 | 6/1965 | Spinanger et al. | 414/395 |
| 3,263,253 | 8/1966 | Wollard et al. | 14/71 |
| 3,528,566 | 9/1970 | Weir | 214/16.4 |
| 3,717,270 | 2/1973 | Rooke et al. | 414/414 |
| 3,827,590 | 8/1974 | Lodjic | 214/505 |
| 4,026,388 | 5/1977 | Creissels | 187/245 |
| 4,142,812 | 3/1979 | Steinkuhl | 403/292 |
| 4,984,756 | 1/1991 | Anders | 414/515 X |
| 5,125,481 | 6/1992 | Shibata | 187/12 |
| 5,186,596 | 2/1993 | Boucher et al. | 414/395 |
| 5,465,929 | 11/1995 | Dooley | 403/294 X |

FOREIGN PATENT DOCUMENTS

| | | | |
|---|---|---|---|
| 7806483 | 12/1979 | Netherlands | 414/510 |
| 45477 | 5/1926 | Norway | 414/538 |

OTHER PUBLICATIONS

Jetlift, Passenger Boarding Bridge Equipment Lift brochure, Jet Terminal Service, Henefer, Utah, 6 pages.
Passenger Bridge Baggage Chute brochure, J & B Aviation Services, Inc., Fairfield, CA, 1 page.
Drawings of Baggage Slide, Airport Automation Corporation, Indianapolis, IN., Sheets 1, 4, 5, 6, 7, 8 and 9, 14 pages, Dec. 16, 1997.

*Primary Examiner*—Steven A. Bratlie
*Attorney, Agent, or Firm*—Geoffrey A. Mantooth

[57] ABSTRACT

A slide extends from an upper level platform to a lower level. The slide includes a bed with a smooth top surface and side frames that project upwardly from the bed. The bed is a sheet having upraised lips along its side edges. The lips are received by first channels in the side frames. Crossbars extend transversely beneath the bed, with the ends of the crossbars being received by second channels in the side frames. A groove is formed in the top surface of the bed, which groove receives a line. The line is coupled to a motor and to a carrier located on the slide, wherein the carrier traverses up and down the slide. Objects can be raised and lowered between the two levels using the carrier. Alternatively, objects can be allowed to slide down the bed.

15 Claims, 9 Drawing Sheets

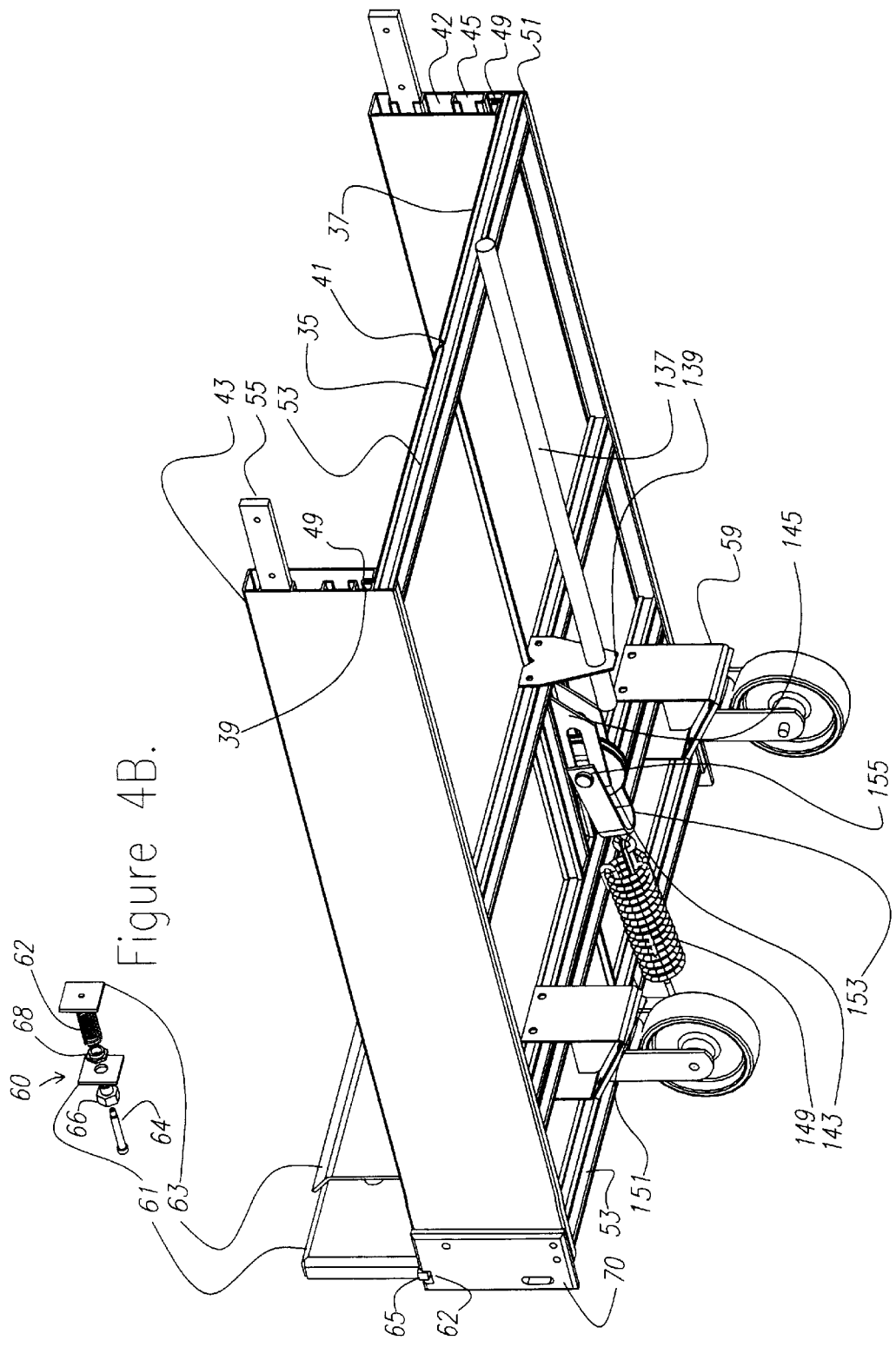

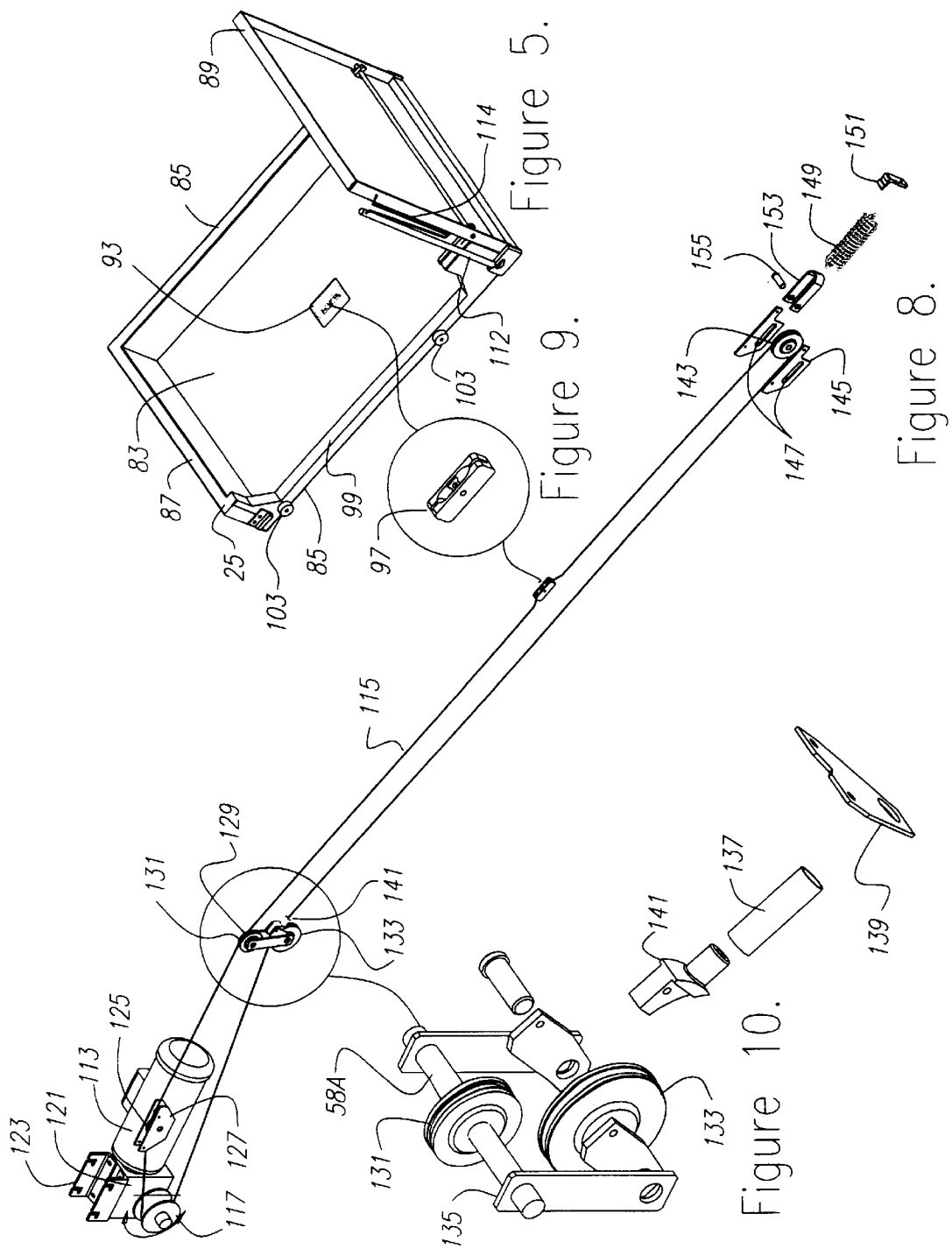

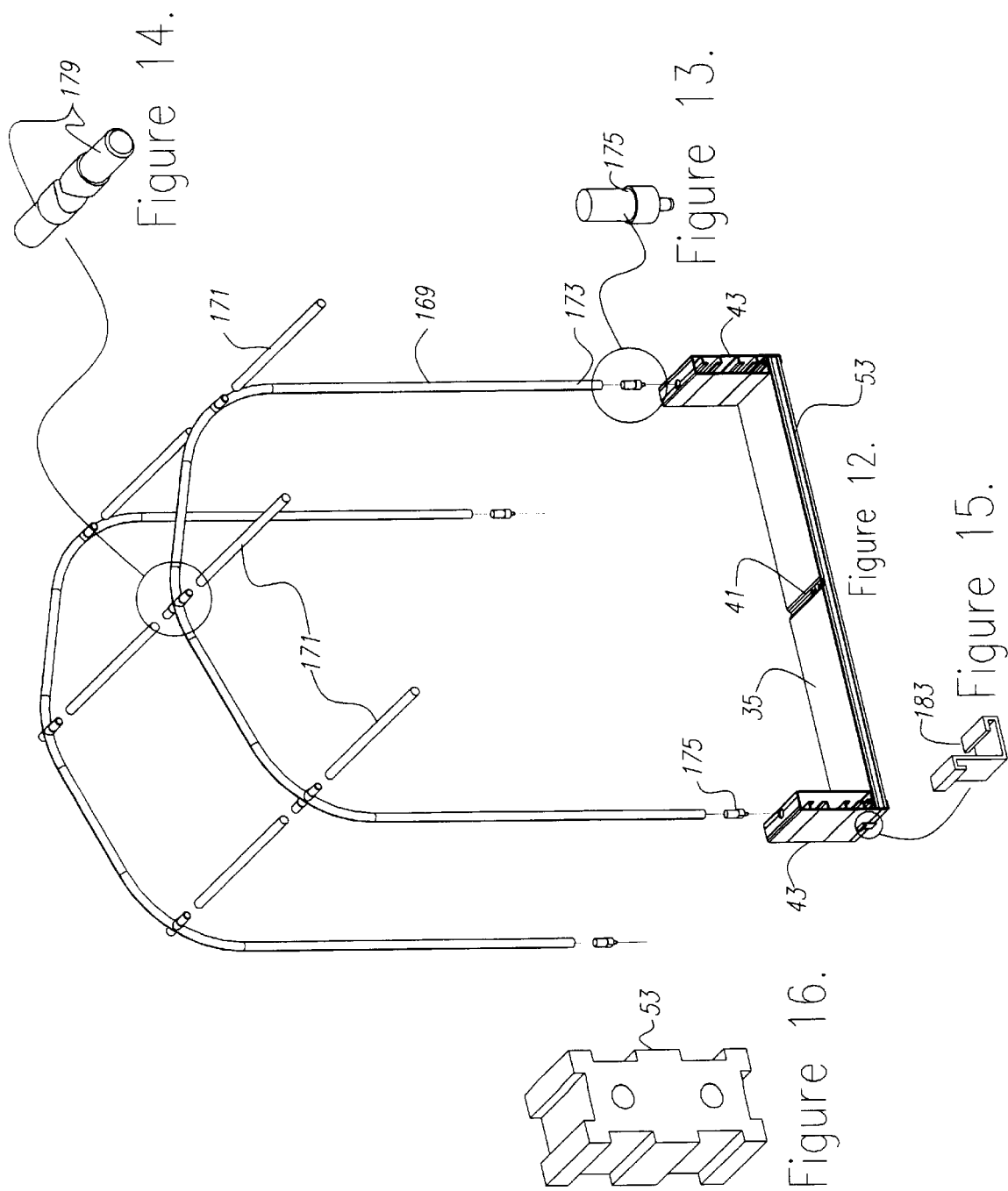

APPARATUS FOR RAISING AND LOWERING BAGGAGE FROM AN ELEVATED PLATFORM

This application claims the benefit of U.S. Provisional application Ser. No. 60/090,346, filed Jun. 23, 1998.

BACKGROUND OF THE INVENTION

Passengers typically board a large jet aircraft, such as a Boeing 707 or larger, by way of passenger boarding bridges. A passenger boarding bridge extends out from the terminal to the aircraft hatch. The aircraft hatch is elevated off of the ground, as is the terminal. Beneath the terminal, cargo can be handled and transported easily to and from the aircraft. Therefore, the bridge allows passengers to cross from the elevated terminal to the elevated hatch.

Many passengers board aircraft with carryon baggage. Some of this baggage may not fit inside of the cabin storage facilities and must be loaded into the cargo hold of the aircraft. In addition, some passengers may require wheelchairs to get to the passenger door of the aircraft. After reaching the aircraft's passenger door, the wheelchairs are stored in the cargo hold.

Baggage and wheelchairs that are on the passenger boarding bridge and that need to be stored in the cargo hold of the aircraft must be lowered to the ground from the bridge. Likewise, after a flight, wheelchairs and certain baggage that are to be returned to deplaning passengers at the passenger door must be raised up to the bridge level.

This invention accomplishes both tasks of raising and lowering cargo to and from the passenger boarding bridge from the ground.

SUMMARY OF THE INVENTION

It is an object of the present invention to provide an apparatus that allows objects to slide down from an upper level to a lower level.

It is another object of the present invention to provide an apparatus that can raise and lower objects.

It is still another object of the present invention to provide an apparatus that can raise and lower objects to and from an airport passenger boarding bridge.

It is still a further object to provide an apparatus that can raise and lower objects adjacent to a stairway.

It is still another object to provide an apparatus that extends between two locations, which apparatus is light in weight, inexpensive and strong.

There is provided an apparatus for raising and lowering objects between an upper level and a lower level. The apparatus has a slide with upper and lower ends. The slide has a smooth inclined surface that extends between the upper and lower ends. The slide has side walls that project upwardly from the sides of the inclined surface. A platform is located at the upper level. The slide is coupled to the platform by a hinge. The bottom end of the slide is structured and arranged to bear on the lower level. A carrier is movable along the slide between the upper and lower ends. The carrier bears on the inclined surface and is between the side walls. The apparatus also has a motor. A line extends from the carrier to the motor in the direction of the slide for raising and lowering the carrier along the slide.

In accordance with one aspect of the present invention, the line includes an endless loop that traverses along the top of the slide in a channel and that traverses underneath the slide.

In accordance with another aspect of the present invention, the line is coupled to the motor by way of a sheave.

In accordance with still another aspect of the present invention, the loop of line includes a tensioner.

In accordance with still another aspect, the carrier comprises rollers that bear on the inclined surface of the slide.

In accordance with still another aspect of the present invention, the carrier is movable across the hinge between the platform and the upper end of the slide.

In accordance with another aspect, there is a leveler that is in addition to the inclined surface and that cooperates with the carrier as the carrier crosses the hinges so as to control the orientation of the carrier.

In accordance with another aspect of the present invention, there is provided a gate at the lower end of the slide. The gate is capable of being opened and closed.

In accordance with still another aspect of the present invention, the carrier has an upper end and a lower end. The lower end of the carrier has a ramp thereon with the ramp being movable between up and down positions.

In accordance with still another aspect of the present invention, the slide is formed from upper and lower portions with each of the upper and lower portions having a bed with a smooth surface and hollow side walls. The upper and lower portions are coupled together by connectors located within the side walls and extending between the upper portion side walls and the lower portion side walls.

In accordance with still another aspect of the present invention, the slide includes a bed and side walls. Each of the side walls have first and second channels extending along the length of the respective side wall. The first and second channels are at an angle with respect to each other. The beds have sides with each side having a lip that is received by the first channel of the respective side wall. Crossbars extend underneath the bed from one side wall to the other side wall with each of the crossbars having two ends. The respective crossbar ends are received in the second channel of the respective side wall.

In accordance with another aspect of the present invention, there is provided a canopy skeleton comprising poles that extend up from the side walls on the slide. The skeleton extending from the upper end to the lower end of the slide. A canopy covers the skeleton.

There is also provided an apparatus for raising and lowering cargo from an upper level to a lower level for use in aircraft loading and unloading operations. An aircraft passenger boarding bridge is provided, with the bridge having a floor located at the upper level, the floor being located above the lower level. A slide has an upper end that is coupled to the bridge and a lower end that bears on the lower level. The slide has a smooth inclined surface that extends between the upper and lower ends. A carrier is movable along the slide between the upper and lower ends. There is a motor and a line extending in the direction of the slide from the carrier to the motor for raising and lowering the carrier along the slide.

There is also provided an apparatus for extending from a first location to a second location. There are first and second side frames extending generally parallel to each other and spaced apart from each other. Each side frame has walls that form an enclosure with a hollow interior. Each side frame has first and second channels located in the enclosure. Each side frame has third and fourth channels located outside of the enclosure. The third and fourth channels are substantially perpendicular to each other. Each side frame has a length that extends between two ends with the first channel at one of the ends receiving a portion of a splice member. A plate extends between the first and second side frames. The plate has a lip along each side frame, the respective lip being received in the respective third channel. Cross beams extend between the side frames. Each of the cross beams have two ends with the cross beam ends being received by the respective fourth channel. The sides of the bed are interposed between the crossbars and the third channel.

BRIEF DESCRIPTION OF THE DRAWINGS

FIG. 4 is a bottom isometric view of the lower slide portion.

FIG. 4B is an exploded detail view of a spring cushion in the bumper plate.

FIG. 5 is an isometric top view of the carrier.

FIG. 8 is an isometric view of the cable arrangement.

FIG. 9 is detailed view of the cable connector.

FIG. 10 is an exploded isometric detailed view of the intermediate pulleys.

FIG. 12 is an isometric exploded view showing the construction of the canopy framework.

FIG. 13 is a detailed view of a canopy tubing plug.

FIG. 14 is a detailed view of a canopy tubing connector.

FIG. 15 is a detailed view of a canopy tie down clip.

FIG. 16 is an end view of a crossbar.

DESCRIPTION OF THE PREFERRED EMBODIMENT

Figure 1:
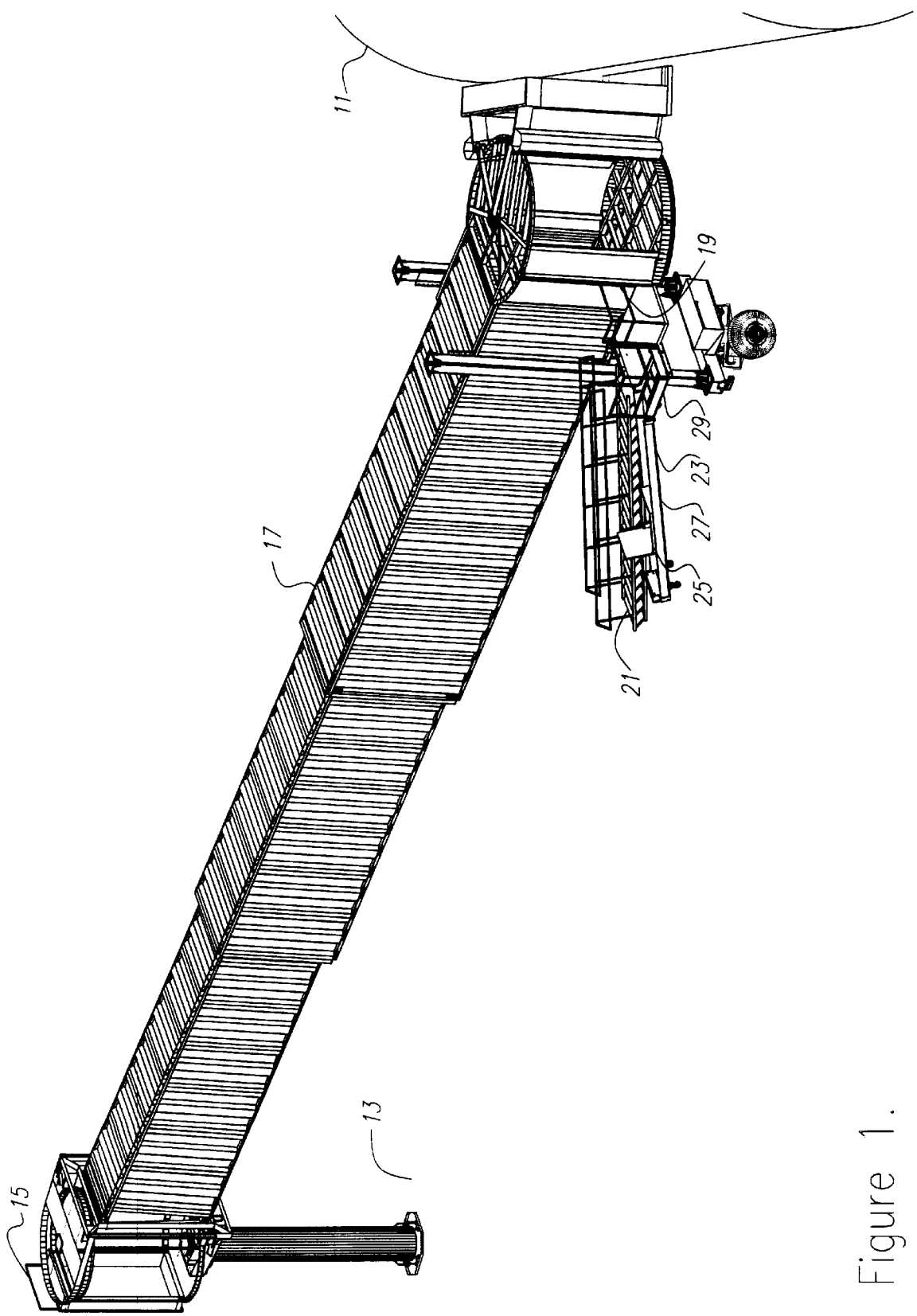
FIG. 1 is a schematic view of an aircraft passenger boarding bridge, equipped with the slide apparatus of the present invention, in accordance with a preferred embodiment.

In FIG. 1, there is shown a typical scenario at an airport. An aircraft 11 is on the ground 13 at a terminal 15. A passenger boarding bridge 17 extends from the terminal 15 to a hatch on the aircraft 11. Passengers and crew can embark and/or deplane using the bridge.

The bridge 17 is conventional and commercially available. The bridge can typically telescope in length and raise or lower its end in order to meet the aircraft hatchway.

The bridge 17 is elevated off of the ground. Cargo, such as baggage, can be loaded or unloaded between the aircraft and the ground level. The cargo is moved back and forth between the terminal and the aircraft on the ground level.

The bridge has a side door 19 that opens out onto a stairway 21 (see FIG. 2), which stairway leads to the ground 13.

The bridge 17 is equipped with a slide apparatus 23 that is located adjacent to the stairs and that extends from the bridge down to ground level 13. If cargo is to be lowered down from the bridge to ground level, the cargo is merely placed on the slide and allowed to slide down to the bottom. There, an operator removes the cargo. If the cargo is to be raised from ground level up to the bridge, then the cargo is placed on a carrier 25. The carrier is pulled up to the upper end by a motor. An operator unloads the cargo onto the stairway landing and brings it inside of the bridge through the door 19.

The slide apparatus 23 can be used in a variety of applications not involving aircraft. For example, the slide apparatus can be used to load and unload cargo or objects between a passenger ship and a dock. Also, the slide apparatus need not be located adjacent to stairs.

Figure 2:
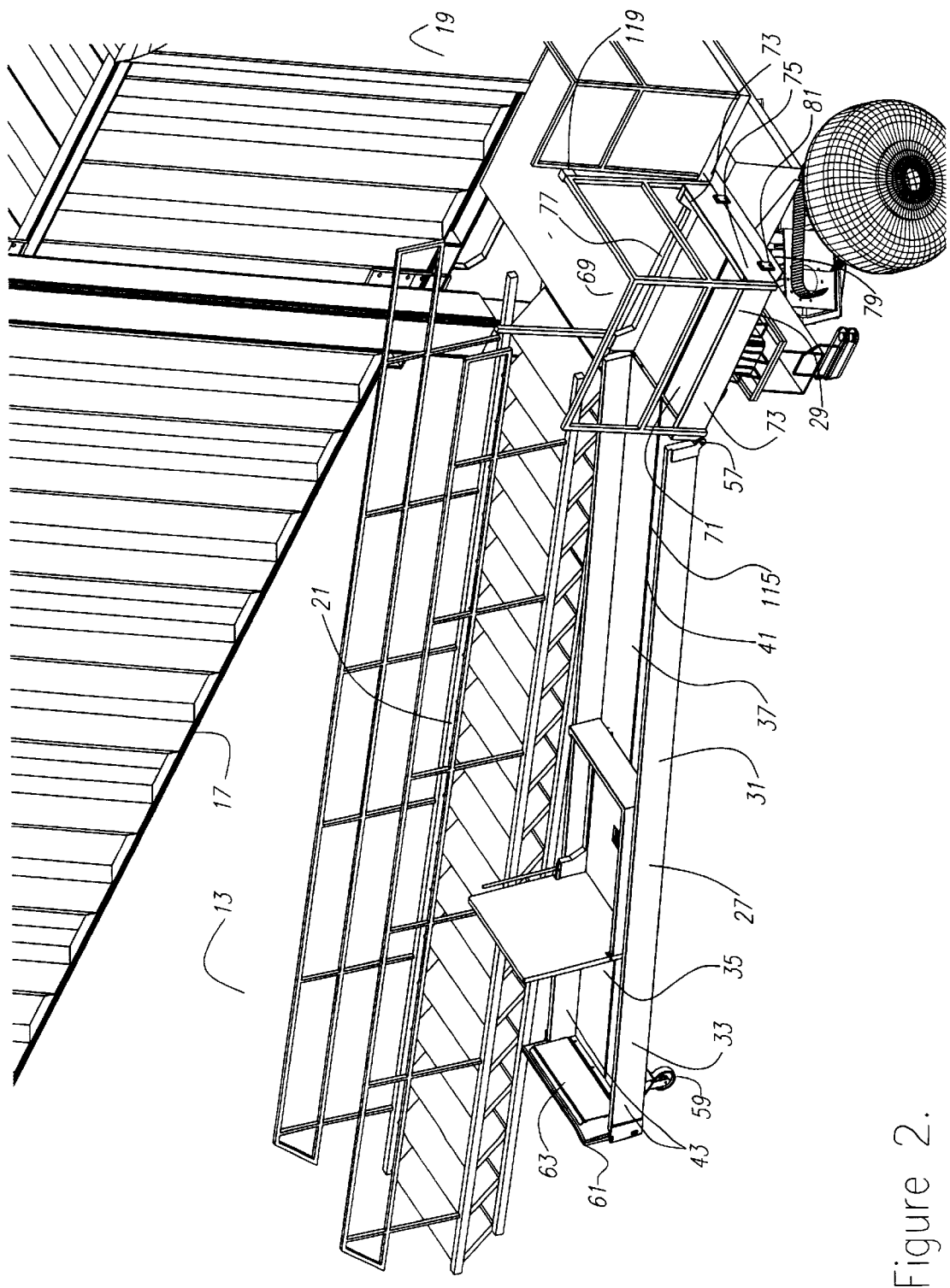
FIG. 2 is a perspective view of the top side of the slide apparatus, as mounted onto the passenger bridge.
Figure 3:
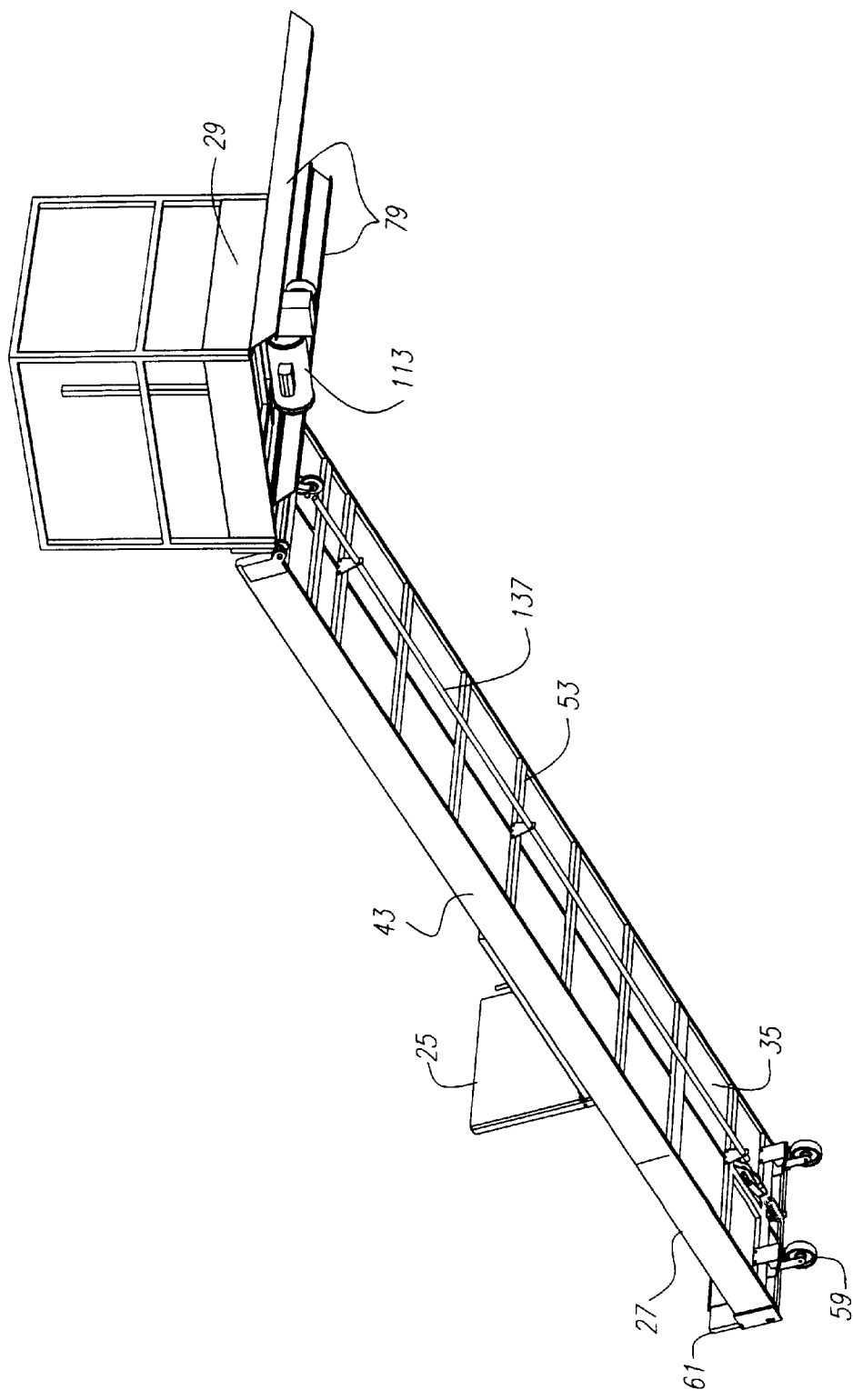
FIG. 3 is an isometric view of the bottom side of the slide apparatus.

Referring to FIGS. 2 and 3, the slide apparatus 23 will now be described in more detail. The slide apparatus 23 includes a slide 27, a platform 29, and the carrier 25.

The slide 27 is made up of plural portions, for ease of repair. Thus, there is a main portion 31 and a lower portion 33. The lower portion 33 extends from the ground 13 up, while the main portion 31 extends upwardly from the lower portion.

The slide apparatus 23 is designed to be easily repaired. It is typically located in an environment where it is hit, rammed and banged. For example, the lower end may be hit by a baggage cart. Instead of replacing the entire slide, only the lower portion need be replaced in this type of situation.

Figure 4A:
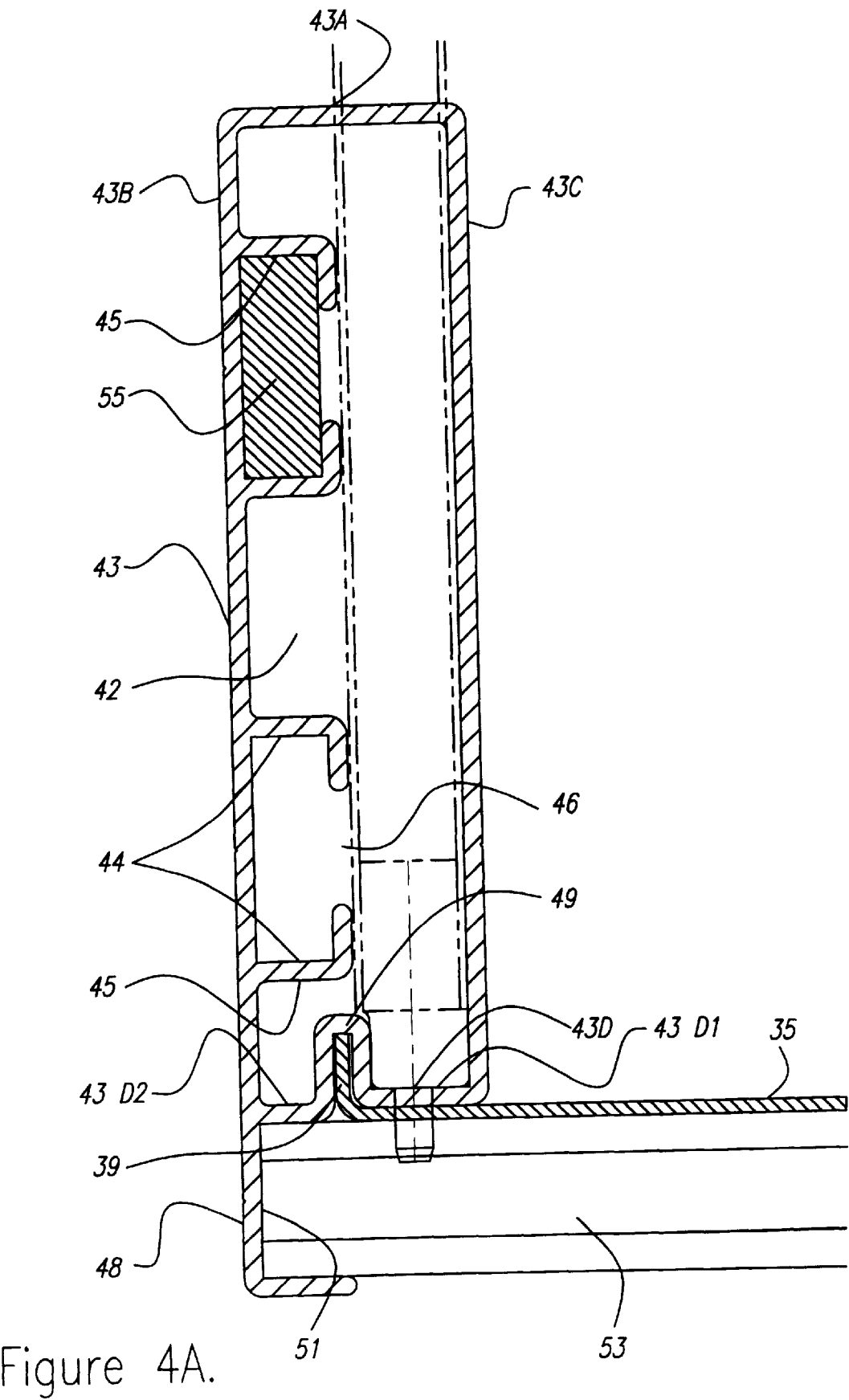
FIG. 4A is a transverse cross-sectional detail view of a side frame and bed of the slide apparatus.

Referring to FIGS. 4 and 4A, each slide portion 31, 33 has a bed 35. The bed 35 has a smooth, flat top surface 37 upon which items are allowed to slide. In the preferred embodiment, the bed 35 is made of formed metal. As shown in FIG. 4, the bed 35 is a sheet having each of its side edges formed in an upward lip 39. In addition, there is a groove 41 extending parallel to the side edge lips 39 and located midway between the lips. The bed 35 can be formed from a plurality of sheets laid end to end.

Elongated side frames 43 are provided along the bed 35 and extend above the bed. Referring to FIG. 4A, each side frame 43 is a hollow extruded piece that is generally rectangular in transverse cross-sectional shape. Each side frame has a top wall 43A, two parallel side walls 43B, 43C and a bottom wall 43D. The walls form an interior cavity 42, which cavity is open at the two ends of the side frame. The interior cavity has two splice reinforcing guide channels 45. Each guide channel 45 is formed by two "L" shaped walls 44 that project perpendicularly from one of the side walls to a position about midway between two side walls and then project towards each other. The free ends of the two "L" shaped walls are separated from each other by a gap 46. The two guide channels 45 are separated from each other by a distance.

The two guide channels 45 are used to splice or join two side frames together in an end to end manner. The space between the two guide channels is used to hold wire or cable.

The bottom wall 43D has a channel 49 therein. The groove penetrates into the interior cavity 42. The groove forms a bed locking channel 49, which channel receives the lip 39 of the bed 35. The bottom wall 43D has first and second portions 43D1, 43D2 that are separated from one another by the channel 49 and that are offset from one another. On one side of the channel 49, the bottom wall first portion 43D1 is closer to the top wall 43A than is the bottom wall second portion 43D2. This offset allows the bottom of the bed 35 to be flush with the bottom wall second portion 43D2.

The side wall 43B that is nearest the bottom wall second portion 43D2 extends past the bottom wall and then turns to extend parallel to the bottom wall. This extension 48 forms a cross bar channel 51 which opens towards the other side wall 43C.

The bed locking channel 49 and the crossbar channel 51 are perpendicular to each other. Crossbars 53 (the end view of which is shown in FIG. 16) extend transversely with respect to the side frames 43 and are located underneath the bed 35. The ends of the crossbars 53 are received in the respective crossbar channels 51. Fasteners, such as screws, are used to secure the crossbars to the side frames. The crossbars 53 are spaced apart several feet from each other. With the crossbars 53 in place in the side frames, the bed 35 is clamped into the bed locking channel 49. In addition, blocks made from short sections of the crossbars can be interspaced between the crossbars and inserted into the crossbar channel 51 to provide for additional support for the bed 35.

The side frames 43, the bed 35 and the crossbars 53 form a strong, light weight and rigid structure that spans a distance between two locations. This structure is well suited for the slide and for other applications.

The lower and main slide portions 33, 31 are joined together with splice bars 55. One-half of each splice bar 55 is inserted into the respective reinforcing guide channel 45 of the lower slide portion 33, while the other one-half of each splice bar is inserted into the respective reinforcing guide channel 45 of the main slide portion 31. Fasteners extend through the side frames 43 into the splice bars 55 to secure the portions together. FIG. 4 shows only one splice bar per side frame. However, additional splice bars 55 channels 45 can be used.

The main slide portion 31 has a hinge 57 (see FIG. 2) in its upper end. This hinge is used to secure the slide to the platform 29, as will be explained more fully below. The lower slide portion 33 has casters 59 mounted underneath. There is also a gate 61 that moves between open and closed positions. The gate 61 is hinged to the side frames 43. In the closed position, shown in FIGS. 2–4, the gate 61 extends perpendicularly to the bed 35. In the open position, the gate pivots down. The gate 61 has a spring loaded bumper plate 63 on its uphill side. The bumper plate 63 cushions the impact of objects sliding down the slide.

A spring cushion 60 for the bumper plate 63 is shown in FIG. 4B. A coil spring 62 is interposed between the bumper plate 63 and the gate 61. A bolt 64 extends through the spring 62. One end of the bolt 64 threads into the bumper plate 63. The other end of the bolt is secured to the gate 61 by a nut 66 and a washer/nut 68. The nut 66 slips onto the bolt 64 and threads into the gate 61 and the washer/nut 68. One end of the spring 62 bears on the washer/nut 68, while the other end bears on the bumper plate 63.

There are several of the spring cushions 60 that couple the bumper plate to the gate.

The gate 61 has a pin 65 (see FIG. 4) on each side that extends out and is received by a notch 62 in a hinge plate 70 that is coupled to the respective side frame 43. The pins lock the gate in the closed position. Other pins extend from the gate into slots in the hinge plate to form the pivoting hinge. To open the gate 61, the gate is picked up until the pins 65 clear the notches 62, wherein the gate is pivoted open.

The platform 29 is a horizontal extension of the staircase landing 69 (see FIGS. 2 and 3). The platform 29 has a bed 71 and side frames 73 that are substantially similar to the bed 35 and side frames 43 of the slide 27. In addition, there is an end frame 75 that extends between the two side frames 73 at one end of the platform. The other end of the platform has no wall in order to allow movement between the platform and the slide. The side frame 73 that is closest to the staircase landing 69 is notched 77 in order to allow easy access to the platform by an operator. The end frame 75 is substantially similar to the side frames 43.

The platform 29 is mounted to the staircase landing 69 by mounting beams 79. The beams 79 extend under both the platform 29 and the landing 69. The beams connect to the platform and the landing by way of brackets 81.

The upper end of the slide 27 is mounted to the open end of the platform by the hinge 57. The hinge 57 includes a rod 58A (see FIG. 10) that extends through hinge plates located at the ends of the slide and the platform. Cotter pins in the ends of the rod 58A secure the rod. The hinge 57 (see FIGS. 2 and 3) and the casters 59 allow the slide 27 to accommodate various heights of the bridge 17. The bridge is moved up and down with respect to the ground in order to fit up against various types of aircraft. As the bridge 17 moves up or down, the platform 29 correspondingly moves up or down with respect to the ground. The lower end of the slide, on casters 59, allows the slide to automatically adjust its inclination. As the platform becomes elevated, the slide becomes steeper. Conversely, as the platform is lowered, the slide becomes more horizontal.

Figure 6:
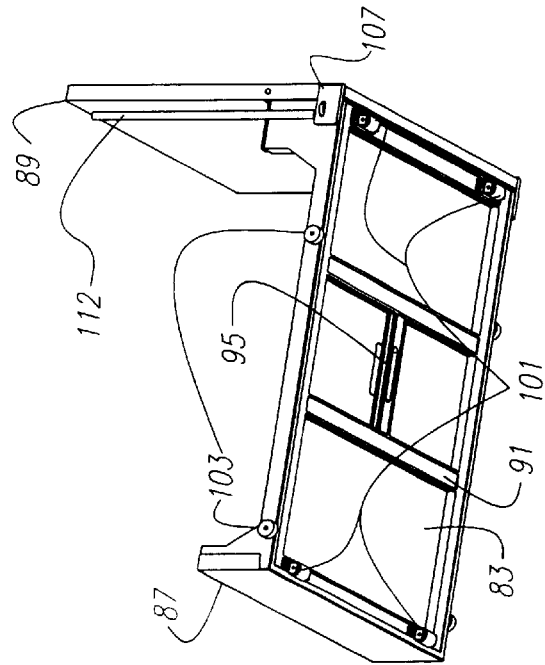
FIG. 6 is an isometric bottom view of the carrier.

The carrier 25 is shown in FIGS. 5 and 6. It has a generally rectangular flat bed 83. Two side frames 85 and an end frame 87 are on three sides of the bed, with the fourth side having a ramp 89. Crossbars 91 extend under the bed 83 from one side frame to another. The bed 83, side frames 85, end frame 87 and crossbars 91 are substantially the same as the bed 35, 71, side frames 43, 73, end frame 75 and crossbars 53 of the slide 27 and platform 29, except that the carrier bed 83 does not have a groove therein. Instead, there is a central opening 93 through the bed 83. A mounting bracket 95 extends under the opening 93 and between two adjacent crossbars 91. A cable connector 97 (see FIG. 9) is mounted to the carrier 25 by way of the mounting bracket 95. The cable connector 97 is accessed through the opening 93. The opening 93 is closed with a cover (not shown). One of the side frames 85 has a notch 99 therein so as to simplify loading and unloading of cargo by an operator on the carrier.

The carrier 25 is sized so as to fit within the slide 27 between the side frames 43. The underside of the carrier 25 has support rollers 101 that are mounted to the crossbars 91. There are four support rollers 101, one in each corner. The support rollers 101 bear on the beds 35, 71 of the slide 27 and platform 29 and allow the carrier to traverse up and down the slide with minimal friction. The carrier is also equipped with leveling wheels 103. The leveling wheels 103 are mounted on the outside of the two side frames 85. The leveling wheels 103 each have an axis of rotation that is parallel to the axes of rotation of the support rollers 101. In the preferred embodiment, there are four leveling wheels, with two wheels on each side. The leveling wheels 103 cooperate with a leveling plate 157 (see FIG. 11) located on each side frame near the hinge 57. The carrier also has guide wheels 105 located at the end (see FIG. 7). There is a guide wheel on each side of the ramp 89. The guide wheels have axes of rotation that are perpendicular to the carrier bed 83. The guide wheels are mounted on a ramp hinge plate 107 and serve to reduce the friction of the ramp hinge plate 107 on the slide side frames 43 and to keep the carrier from wobbling in the slide.

The carrier 25 can be provided with rails or netting in order to maintain objects in the bed 83 thereof.

Figure 7:
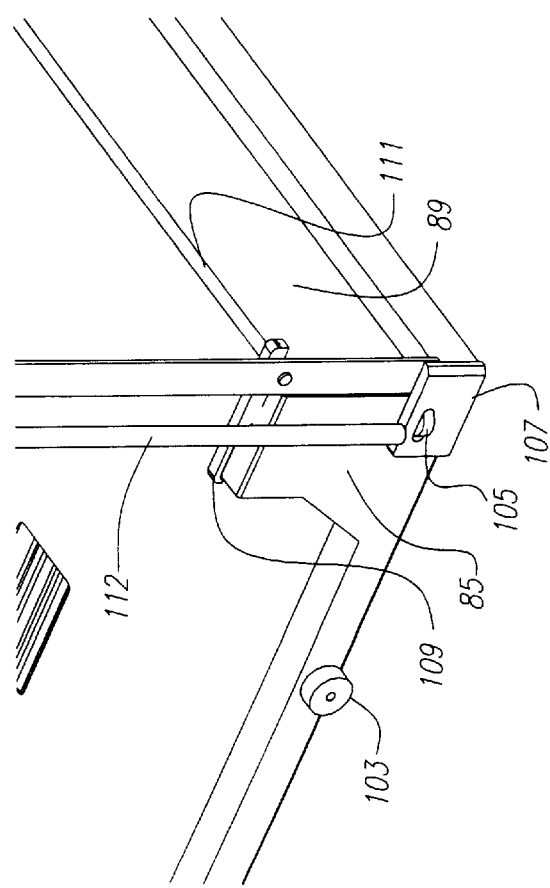
FIG. 7 is a detailed view of one of the lower corners of the carrier.

The ramp 89 is coupled to the carrier side walls 85 by way of a hinge. The ramp 89 is shown in FIGS. 5–7 as being in the up position, wherein the ramp extends up from the bed for some distance above the side walls. The carrier 25 is oriented on the slide so that the ramp 89 is down hill from the other end of the carrier. The ramp 89 can be lowered so that cargo can be rolled on or off of the carrier bed. The ramp 89 is kept in its up position by a spring loaded latch 109 on each side. Each latch 109 catches an edge on the respective side frame 85. The latches are coupled together by a rod 111 such that operating one latch also operates the other latch. To release the ramp, the latches 109 are lifted free of the side frames 85.

A post 112 extends upwardly from the hinge plate 107. The post 112 is adjacent to the side frame with the notch 99. The top of the post 112 is coupled to the ramp 89 by a chain 114. Thus, when the ramp is down, it can be raised by pulling up on the chain.

The carrier 25 is moved up and down the slide by a motor 113 and line arrangement 115. Referring to FIG. 8, the line is a loop of cable 115 that changes direction around pulleys or sheaves. The ends of the cable 115 are swaged and placed into the cable connector 97, which connector is mounted to the carrier 25 as described above. The cable 115 loops around a drive pulley 117 located underneath the platform 29. The drive pulley 117 is rotated by the electric motor 113. The operation of the motor is controlled by a control box 119 (see FIG. 2), which box can be tethered to the slide apparatus. The output shaft of the motor 113 is connected to a reducer 121, which reducer in turn is connected to the drive pulley 117. The motor 113, the reducer 121 and the drive pulley 117 arrangement are connected to one of the mounting beams 79 of the platform 29 by way of mounting brackets 123.

The cable 115 traverses the top of the platform 29 and the slide 27 in the groove 41 that extends along the beds 71, 35. The cable returns underneath the platform and slide.

In the platform 29, the groove 41 has a slotted opening, which opening receives a platform pulley 125. The platform pulley 125 guides the cable between the drive pulley and the bed groove. The platform pulley is mounted beneath the platform by brackets 127.

The cable 115 changes direction from the horizontal platform 29 to the inclined slide with the help of a pulley arrangement 129, shown in FIG. 10. The pulley arrangement 129 has a transition pulley 131 that is aligned with the bottoms of the grooves in the beds of the platform and slide and that is on the rod 58A. Suspended below the transition pulley is a pivot pulley 133. The pivot pulley 133 is mounted to the transition pulley 131 by way of brackets 135 which are pivotally coupled to the rod 58A.

Underneath the slide 27 is a tubular cable guard 137 (see FIGS. 3, 4 and 10). The cable traverses beneath the slide through the guard, which is coupled to the crossbars 53 by brackets 139. A cable pivot guide 141 is provided above the pivot pulley 133. The cable pivot guide 141 is pivotally coupled to the brackets 135 so as to accommodate the various angles of the slide relative to the platform. The cable pivot guide 141 serves to terminate the upper end of the cable guard 137.

At the lower end of the slide 27 is a take up pulley 143 that is mounted underneath the slide by brackets 145 (see FIGS. 4 and 8). Each of the brackets 145 has a slot 147 therein. The slots 147 allow the take up pulley 143 to move closer to or further from the transition pulley 131. A tension spring 149 is provided to keep the cable 115 properly tensioned. The tension spring 149 extends between an anchor 151, that is coupled to a crossbar 53, and a yoke 153, that is rotatably coupled to the axle 155 of the take up pulley 143. The take up pulley is located in an opening in the groove 41 of the slide bed 35.

Thus, referring to FIG. 8, the cable 115 extends from one side of the cable connector 97, up the slide 27 in the groove 41 (not shown in FIG. 8), over the transition pulley 131, to the platform pulley 125, through the bed opening so as to pass underneath the platform, around the drive pulley 117, over the pivot pulley 133, through the pivot guide 141 and the cable guard 137, around the take up pulley 143, out the opening in the bed on top of the slide (but in the groove 41) and to the other side of the cable connector 97. An endless cable loop is formed.

Although the line 115 has been described as being a cable, other types of line could be used, such as rope (natural fiber or synthetic), webbing, chains, etc. In addition, the line need not be a loop, but could simply involve a length of line on the uphill side of the carrier.

Figure 11:
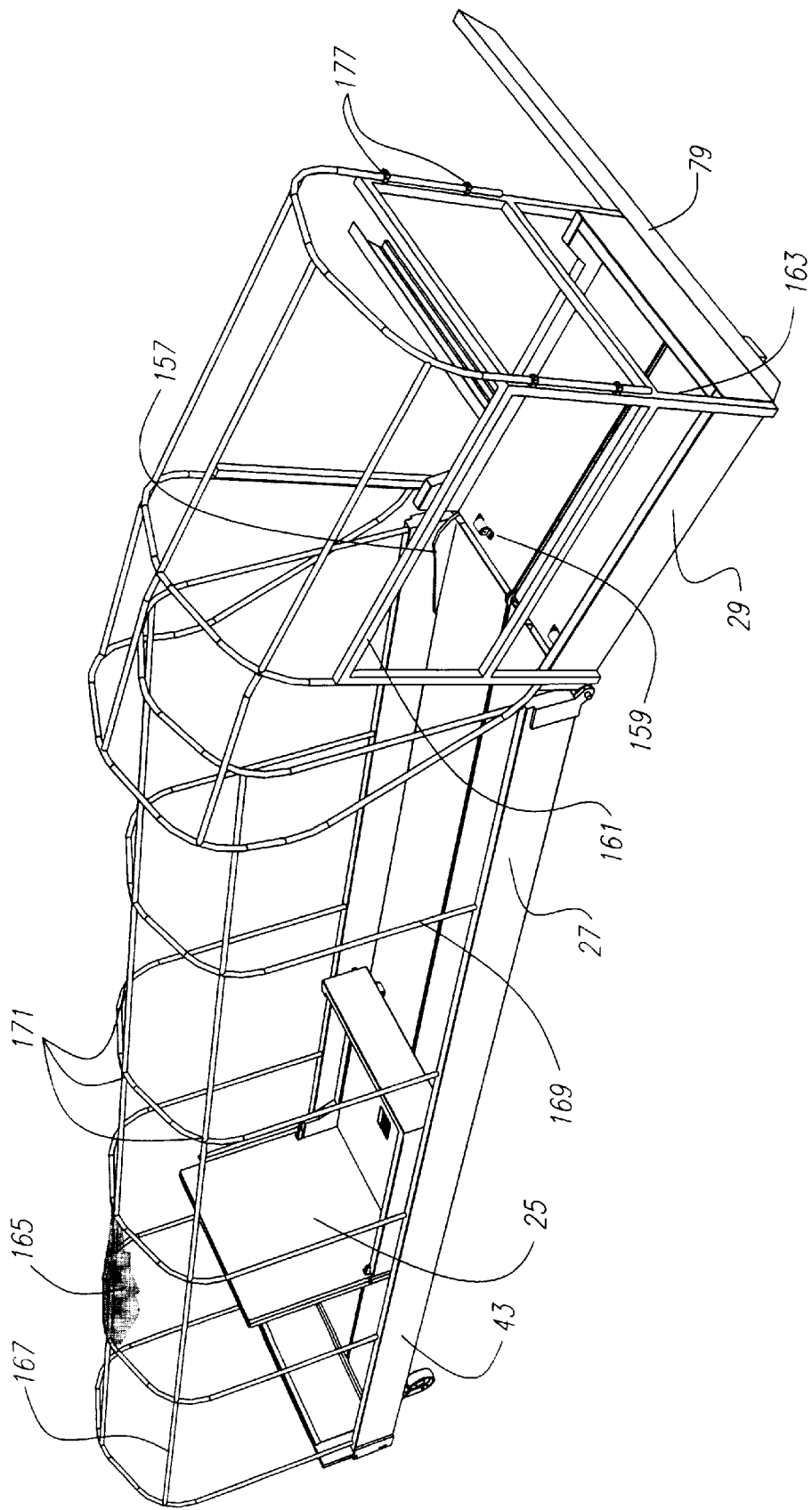
FIG. 11 is a top perspective view of the slide apparatus, shown with the canopy and framework therein.

Referring to FIG. 11, the carrier 25 makes the transition from the horizontal platform 29 to the inclined slide 27 with the assistance of a leveling plate 157. There is a leveling plate 157 coupled to each side frame 43 at the upper end of the slide.

The top edge of each leveling plate 157 forms an extension of the platform over a short portion of the slide downhill from the hinge, followed by a steep ramp to the bed of the slide. The leveling plates 157 work in cooperation with the leveling wheels 103 (see also FIG. 5) on the sides of the carriage. The wheels 103 bear on the top edges of the plates 157. The carrier tends to be heavier at its downhill end because of the combination of the ramp weight and the shifting of the cargo. As the carrier moves up the slide to the platform, the downhill end is raised or leveled in a controlled manner by the leveling wheels 103 bearing on the leveling plate 157. Likewise, as the carrier moves off the platform to the slide, the carrier is inclined in a controlled manner. This minimizes banging of the carrier as it moves between the inclined slide and the horizontal platform.

The platform 29 also has aligning rollers 159. The aligning rollers 159 are in the bed 71 of the platform 29, between the center groove 41 and the side frames 73. The rollers 159 reduce the friction between the carrier and the bed as the carrier makes the transition between the platform and the slide.

The platform 29 has a railing 161 on two sides, supported by vertical posts 163. The lower ends of the posts are coupled to the outside of the side frames. There is also a post between the platform and the staircase landing, near the hinge. This post is not used for the railing, but for the canopy instead.

The slide apparatus 23 is optionally provided with a canopy 165 (see FIGS. 11 and 12) for protection of the baggage from the elements. The canopy 165 is supported by a framework 167. The canopy framework 167 is made up of tubing, namely ribs 169 and purlins 171. The ribs 169 are each shaped like an upside down "U". The ends 173 of the ribs 169 fit into the side frames 43, where they are anchored by way of stabilizing plugs 175. The plugs 175 (see FIGS. 12 and 13) are inside of the side frames and bear on the bottom wall first portion 43D1 (see FIG. 4A). Each plug 175 has a projection 175A that extends through the bottom wall and the bed 35. The ends 173 of the ribs 169 fit over the tops of the plugs 175. Tube clamps 177 (see FIG. 11) are used to secure the ribs 169 to the posts 163 of the platform 29. The purlins 171 extend between the ribs 169; there is a central purlin and two lateral purlins. The ends of each purlin 171 are received by tubing connectors 179 (see FIGS. 12 and 14) that are coupled to the ribs. The tubing connectors 179 are coupled to the ribs by a bolt that is coaxial with the connectors.

The framework 167 is covered with a cloth canopy 165 or other covering. The canopy 165 is secured to the framework by straps (not shown) and to the slide and platform by tie downs. Tie down clips 183 (FIGS. 12 and 15) are provided for the tie downs. The clips couple to the crossbar channel 51 of the side frames 43, at locations having a crossbar.

Installation of the slide apparatus 23 is relatively simple because the apparatus is largely self-contained and self-supporting. The slide apparatus uses the bridge 17 to provide elevation. The platform 29 is secured to the underside of the staircase landing. The slide 27 is assembled by coupling the main and lower portions 31, 33 together. The slide 27 is then hinged to the platform 29. The cable 115 is run through the grooves 41 and the guard 137 and coupled to the carrier 25. Electrical power is connected to the motor 113 and the control panel. The canopy 165 and framework 167 are installed if desired. The lower end or middle portion of the slide can be coupled to the staircase for added stability when the bridge moves laterally.

The operation of the slide apparatus 23 will now be described. Suppose that cargo, such as a piece of luggage or a wheelchair is to be lowered from the bridge 17 to the ground for loading into the cargo hold of an aircraft. An easy way to lower the cargo to the ground is to place it on the upper end of the slide 27. The operator, who is on the landing 69, simply places the cargo on the upper end of the slide. The cargo slides down to the lower end where it can be retrieved. If the carrier 25 is on the platform 29, its ramp 89 can be lowered to allow easy access from the platform to the slide. If the carrier is at the bottom end of the slide, then the cargo will likely hit the upper end of the carrier. The operator can reach over a side frame to unload the cargo.

Alternatively, the carrier 25 can be used to lower cargo such as wheelchairs or relatively fragile cargo; the cargo is lowered to the ground in a controlled manner with the carrier. The ramp 89 is placed in the up position on the carrier and the cargo is loaded onto the carrier bed 71. The cargo can be picked up and set down in the carrier, or if the cargo is too heavy, it can be rolled or pushed from the landing to the carrier bed. The notch 99 is preferably flush with the landing top surface. Then an operator activates the motor 113 to lower the carrier. The motor 113 and drive pulley 117 pull the underneath cable from the bottom to the top of the slide. This, plus gravity, cause the carrier 25 to be pulled down the slide. The trip down the slide by the carrier is controlled because the cable on the uphill side of the carrier and on top of the slide prevents the carrier from sliding out of control.

When the carrier reaches the bottom, the operator turns off the motor. Alternatively, a stop switch can be used to sense when the carrier reaches the bottom and to automatically shut off the motor. Various mechanisms can be used to sense the bottommost position of the carrier, such as a mechanical switch, an optical sensor, a magnetic sensor or a motor load sensor.

After the motor has been stopped, the slide gate 61 is opened by the operator. The cargo is unloaded from the carrier. The cargo can be simply picked up, or if too heavy, can be rolled or pushed off. The operator picks up the gate slightly to release it and then pivots it down towards the ground. Then the operator unlatches the ramp 89 on the carrier and pivots it down until the end of the ramp rests on the ground. The cargo can be rolled or slid down the ramp.

Raising cargo from the ground level to the bridge utilizes the reverse of the process described above. The carrier is loaded, the ramp and gate are closed, and the motor (operating in reverse) and cable pull the carrier up the slide. The carrier is stopped when it is on the platform. The cargo is then off loaded.

The operator can choose to use either the carrier or the slide for handling cargo. The slide serves as both a ramp for lowering cargo, and also as a trackway for the cargo basket, when the carrier is in use. Thus, the slide provides a controlled descent and ascent for lowering and raising the cargo.

The cable stays in the grooves on top of the slide so as not to interfere with cargo sliding down the slide.

In addition, the carrier makes the transition from the horizontal slide platform assembly to the inclined slide with great ease.

Locating the slide apparatus adjacent to stairs allows an operator to lean over from the stairs and reach cargo that is located on the main portion of the slide.

The foregoing disclosure and the showings made in the drawings are merely illustrative of the principles of this invention and are not to be interpreted in a limiting sense.

What is claimed is:

1. An apparatus for raising and lowering objects between an upper level and a lower level, comprising:
   a) a slide having an upper end and a lower end, the slide having a smooth inclined surface that extends between the upper and lower ends, the slide having side walls that project upwardly from the sides of the inclined surface;
   b) a platform located at the upper level, the slide being coupled to the platform by a hinge;
   c) the bottom end of the slide being structured and arranged to bear on the lower level;
   d) a carrier movable along the slide between the upper and lower ends, the carrier bearing on the inclined surface and being between the side walls;
   e) a motor;
   f) a line extending between the carrier and the motor in the direction of the slide for raising and lowering the carrier along the slide.

2. The apparatus of claim 1 wherein the line comprises an endless loop that traverses along the top of the slide in a channel and that traverses under the slide.

3. The apparatus of claim 2 wherein the line is coupled to the motor by way of a sheave.

4. The apparatus of claim 2 further comprising a tensioner on the loop.

5. The apparatus of claim 1 wherein the carrier further comprises rollers that bear on the inclined surface of the slide.

6. The apparatus of claim 1 wherein the carrier is movable across the hinge between the platform and the upper end of the slide.

7. The apparatus of claim 6 further comprising a leveler that is in addition to the inclined surface and that cooperates with the carrier as the carrier crosses the hinge so as to control the orientation of the carrier.

8. The apparatus of claim 1 further comprising a gate at the lower end of the slide, the gate capable of being open and closed.

9. The apparatus of claim 1 wherein the carrier has an upper end and a lower end, the lower end of the carrier having a ramp thereon, the ramp being movable between an up position and a down position.

10. The apparatus of claim 1 wherein the slide is formed from upper and lower portions, with each of the upper and lower portions having a bed with a smooth surface and hollow side walls, the upper and lower portions being coupled together by connectors located within the side walls and extending between the upper portion side walls and the lower portion side walls.

11. The apparatus of claim 1 wherein the slide comprises:
   a) a bed;
   b) side walls, each of the side walls having first and second channels extending along the length of the respective side wall, the first and second channels being at an angle with respect to each other, the bed having sides, each side of the bed having a lip that is received by the first channel of the respective side wall;
   c) crossbars extending underneath the bed from one side wall to the other side wall, each of the crossbars having two ends, the respective crossbar ends being received in the second channel of the respective side wall.

12. The apparatus of claim 1, further comprising:
   a) a canopy skeleton comprising poles that extend up from the side walls on the slide, the poles being coupled to plugs located on the side walls, the skeleton extending from the upper end to the lower end of the slide;
   b) a canopy coupled to the skeleton.

13. The apparatus of claim 12 further comprising tie down clips coupled to the side walls.

14. An apparatus for raising and lowering cargo from an upper level to a lower level for use in aircraft loading and unloading operations, comprising:
   a) an aircraft passenger boarding bridge, the bridge having a floor located at the upper level, the floor being located above the lower level;
   b) a slide having an upper end that is coupled to the bridge and a lower end that bears on the lower level, the slide having a smooth inclined surface that extends between the upper and lower ends;
   c) a carrier movable along the slide between the upper and lower ends;
   d) a motor;
   e) a line extending in the direction of the slide from the carrier to the motor for raising and lowering the carrier along the slide.

15. An apparatus for extending from a first location to a second location, comprising:
   a) first and second side frames, extending generally parallel to each other and spaced apart from each other, each side frame having walls that form an enclosure with a hollow interior, each side frame having first and second channels located in the enclosure, each side frame having third and fourth channels located outside of the enclosure, the third and fourth channels being substantially perpendicular to each other, each side frame having a length that extends between two ends, with the first channel located at one of the ends receiving a portion of a splice bar;
   b) a plate extending between the first and second side frames, the plate having a lip along each side frame, the respective lip being received in the respective third channel;
   c) cross beams extending between the side frames, each of the cross beams having two ends, with the cross beam ends being received by the respective fourth channel, the sides of the bed being interposed between the crossbars and the third channel.

* * * * *